US012212590B2

(12) United States Patent
Jinno

(10) Patent No.: US 12,212,590 B2
(45) Date of Patent: Jan. 28, 2025

(54) INFORMATION PROCESSING APPARATUS, THREAT INFORMATION EVALUATION SYSTEM, INFORMATION PROCESSING METHOD, AND NON-TRANSITORY COMPUTER READABLE MEDIUM

(71) Applicant: NEC Corporation, Tokyo (JP)

(72) Inventor: Yasuyoshi Jinno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 17/783,081

(22) PCT Filed: Dec. 24, 2019

(86) PCT No.: PCT/JP2019/050483
§ 371 (c)(1),
(2) Date: Jun. 7, 2022

(87) PCT Pub. No.: WO2021/130838
PCT Pub. Date: Jul. 1, 2021

(65) Prior Publication Data
US 2023/0025208 A1    Jan. 26, 2023

(51) Int. Cl.
*H04L 9/40*      (2022.01)
*G06F 40/279*    (2020.01)
*G06N 5/022*     (2023.01)

(52) U.S. Cl.
CPC ......... *H04L 63/1425* (2013.01); *G06N 5/022* (2013.01); *H04L 63/1416* (2013.01); *G06F 40/279* (2020.01)

(58) Field of Classification Search
CPC . H04L 63/12; H04L 63/1416; H04L 63/1425; H04L 63/1433; G06N 5/022; G06F 40/279
See application file for complete search history.

(56) References Cited

U.S. PATENT DOCUMENTS 9,800,597 B2 * 10/2017 Bartos ................. H04L 63/1425
10,972,495 B2 * 4/2021 Berlin ..................... G06F 21/56
(Continued)

FOREIGN PATENT DOCUMENTS

WO   2016/125837 A1   8/2016
WO   2018/159361 A1   9/2018

OTHER PUBLICATIONS

International Search Report for PCT Application No. PCT/JP2019/050483, mailed on Mar. 24, 2020.
(Continued)

*Primary Examiner* — Hosuk Song

(57) ABSTRACT

An information processing apparatus includes: an acquisition unit configured to acquire learning data containing a plurality of items, the learning data being assigned a first level and a second level whose threat level is higher than the first level; a first feature value detection unit configured to detect a first feature value of a specific character string from learning data belonging to the first level; a second feature value detection unit configured to detect a second feature value of the specific character string from learning data belonging to the second level; a difference detection unit configured to detect a difference between the first and second feature values; and a selection unit configured to select, when there is the difference, learning data of an item to which the specific character string belongs.

14 Claims, 12 Drawing Sheets

(56) References Cited

U.S. PATENT DOCUMENTS

| | | | | |
|---|---|---|---|---|
| 11,310,268 B2* | 4/2022 | Bowditch | .............. | G06N 20/00 |
| 11,470,097 B2* | 10/2022 | Orihara | .............. | H04L 63/1425 |
| 11,563,717 B2* | 1/2023 | Miyamoto | .............. | G06F 13/00 |
| 11,856,005 B2* | 12/2023 | Mutolo | .............. | H04L 63/1433 |
| 11,876,821 B1* | 1/2024 | Pratt | .................. | H04L 63/1425 |
| 2017/0126724 A1* | 5/2017 | Zhong | .................. | G06F 21/554 |
| 2018/0367561 A1 | 12/2018 | Givental et al. | | |
| 2020/0012784 A1* | 1/2020 | Orihara | .............. | H04L 63/1425 |

OTHER PUBLICATIONS

Fukumu Tsutsumi et al., "Improving Optimization Level Estimation of Malware by Feature Selection", The 32nd Symposium on Cryptography and Information Security (SCIS 2015), Jan. 20, 2015.

* cited by examiner

EXAMPLE OF LEARNING DATA

| device Vendor | source Port | source Address | device Action | ... | User-Agent | Host | ... |
|---|---|---|---|---|---|---|---|
| PaloAlto Networks | 33000 | 192.168.2.2 | Attack Blocked | ... | curl/ 7.10.0 | google .com | ... |
| PaloAlto Networks | 22222 | 172.16.1.100 | Alert | ... | Python -urllib /3.3 | yahoo .co.jp | ... |
| ... | ... | ... | ... | ... | ... | ... | ... |

ITEM (COLUMN)

Fig. 6

| THREAT LEVEL | sourcePort | http_response _content_type | http_user_agent | http_host |
|---|---|---|---|---|
| LEVEL 1 | 55202 1 hit<br>29766 1 hit<br>... | text/html 100 hits<br>text/plain 10 hits<br>... | Mozilla 100 hits<br>python-requests 10 hits<br>... | www.normal1.com 90 hits<br>www.malicious1.com 10 hits<br>www.malicious2.com 10 hits<br>... |
| LEVEL 2 | 16027 1 hit<br>39777 1 hit<br>... | text/html 100 hits<br>text/plain 10 hits<br>... | python-requests 90 hits<br>Mozilla 20 hits<br>... | www.malicious1.com 50 hits<br>www.malicious2.com 50 hits<br>www.normal1.com 10 hits<br>... |

Fig. 9

INFORMATION PROCESSING APPARATUS, THREAT INFORMATION EVALUATION SYSTEM, INFORMATION PROCESSING METHOD, AND NON-TRANSITORY COMPUTER READABLE MEDIUM

This application is a National Stage Entry of PCT/JP2019/050483 filed on Dec. 24, 2019, the contents of all of which are incorporated herein by reference, in their entirety.

TECHNICAL FIELD

The present invention relates to an information processing apparatus, a threat information evaluation system, an information processing method, and a non-transitory computer readable medium.

BACKGROUND ART

A security operator (e.g., an SOC (Security Operation Center)) receives threat information (e.g., logs of electronic apparatuses and packets associated therewith) from organizations such as companies and, in most cases, manually assigns threat levels to an enormous amount of threat information. However, the amount of received threat information is enormous, but there is a limit to the amount thereof which can be manually analyzed and assigned threat levels. To cope with this problem, there is a method for automatically assigning threat levels to an enormous amount of threat information.

Patent Literature 1 discloses an attack pattern extraction apparatus including an extraction unit that extracts common character strings of parameters in access logs of communication that has been determined to be an attack, and an attack pattern generation unit that generates an attack pattern based on, among consecutive character strings extracted by the extraction unit, a character string whose string length is longer than or equal to a predetermined string length.

CITATION LIST

Patent Literature

Patent Literature 1: International Patent Publication No. WO2018/159361.

SUMMARY OF INVENTION

Technical Problem

However, in the aforementioned prior art literature, it is impossible to appropriately select learning data containing a character string necessary for assigning of a threat level.

The present invention has been made to solve such a problem, and an object thereof is to provide an information processing apparatus, a threat information evaluation system, an information processing method, and a program capable of appropriately selecting learning data containing a character string that can contribute to assigning of threat levels.

Solution to Problem

An information processing apparatus according to a first aspect of the present disclosure includes:
  an acquisition unit configured to acquire learning data containing a plurality of items, the learning data being assigned a first level and a second level whose threat level is higher than the first level;
  a first feature value detection unit configured to detect a first feature value of a specific character string from learning data belonging to the first level;
  a second feature value detection unit configured to detect a second feature value of the specific character string from learning data belonging to the second level;
  a difference detection unit configured to detect a difference between the first and second feature values; and
  a selection unit configured to select, when the difference is larger than or equal to a threshold, learning data of an item to which the specific character string belongs.

An information processing method according to a second aspect of the present disclosure includes:
  acquiring learning data containing a plurality of items, the learning data being assigned a first level and a second level whose threat level is higher than the first level;
  detecting a first feature value of a specific character string from learning data belonging to the first level;
  detecting a second feature value of the specific character string from learning data belonging to the second level;
  detecting a difference between the first and second feature values; and
  selecting, when the difference is larger than or equal to a threshold, learning data of an item to which the specific character string belongs.

A non-transitory computer readable medium storing a program according to a third aspect of the present disclosure causes a computer to perform:
  a process of acquiring learning data containing a plurality of items, the learning data being assigned a first level and a second level whose threat level is higher than the first level;
  a process of detecting a first feature value of a specific character string from learning data belonging to the first level;
  a process of detecting a second feature value of the specific character string from learning data belonging to the second level;
  a process of detecting a difference between the first and second feature values; and
  a process of selecting, when the difference is larger than or equal to a threshold, learning data of an item to which the specific character string belongs.

Advantageous Effects of Invention

According to the present disclosure, it is possible to provide an information processing apparatus, a threat information evaluation system, an information processing method, and a program capable of appropriately selecting learning data containing a character string that can contribute to assigning of threat levels.

BRIEF DESCRIPTION OF DRAWINGS

FIG. 6 is an example of a learning data table in which the log data and packet data shown in FIG. 5 are merged;

FIG. 9 is a diagram for explaining an automatic selection of a feature value in detail;

DESCRIPTION OF EMBODIMENTS

First Example Embodiment

Figure 1:
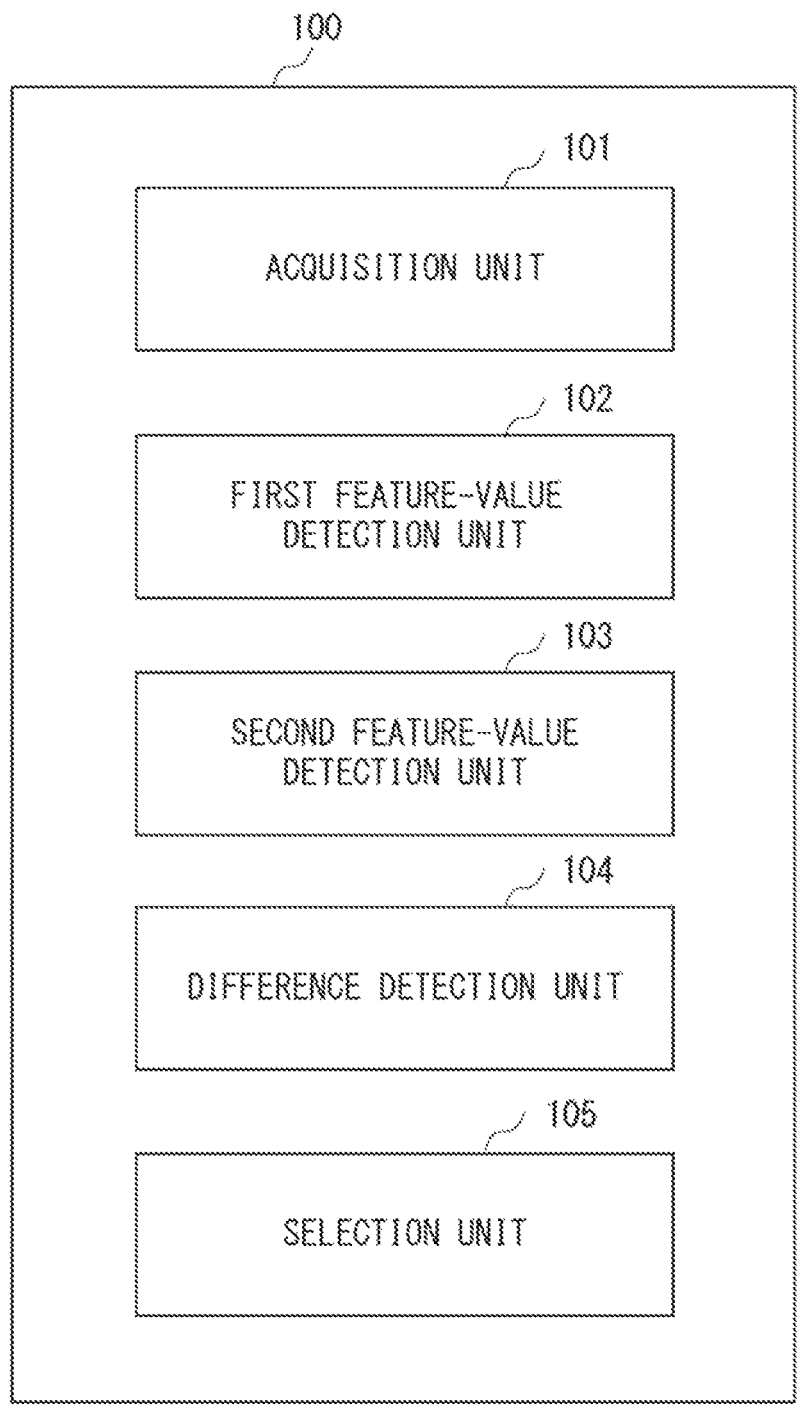
FIG. 1 is a block diagram showing a configuration of an information processing apparatus according to a first example embodiment.

FIG. 1 is a block diagram showing a configuration of an information processing apparatus according to a first example embodiment.

An information processing apparatus 100 includes: an acquisition unit 101 that acquires learning data containing a plurality of items, the learning data being assigned a first level and a second level whose threat level is higher than the first level; a first feature value detection unit 102 that detects a first feature value of a specific character string from learning data belonging to the first level; a second feature value detection unit 103 that detects a second feature value of the specific character string from learning data belonging to the second level; a difference detection unit 104 that detects a difference between the first and second feature values; and a selection unit 105 that selects, when the difference is larger than or equal to a threshold, learning data of an item to which the specific character string belongs.

Here, the item can be any of various items in threat information (learning data) output from a security system (e.g., an IDS (Intrusion Detection System), a firewall, etc.) that prevents unauthorized access to a computer or a network in an organization from the outside thereof. Note that the item may also be referred to as a column or a tuple.

The learning data is threat information that has already been assigned a threat level by an analyst or the like. The threat level includes at least two levels, and the number of threat levels can be set as desired. The threat information can contain, for example, communication logs and packets associated with the communication logs.

In this specification, the character string can contain at least one character, a symbol, a word, a number, and a combination thereof.

The feature value can be, for example, but is not limited to, frequency information.

According to the above-described information processing apparatus in accordance with this example embodiment, it is possible to appropriately select learning data containing character strings that can contribute to assigning of threat levels.

Second Example Embodiment

Figure 2:
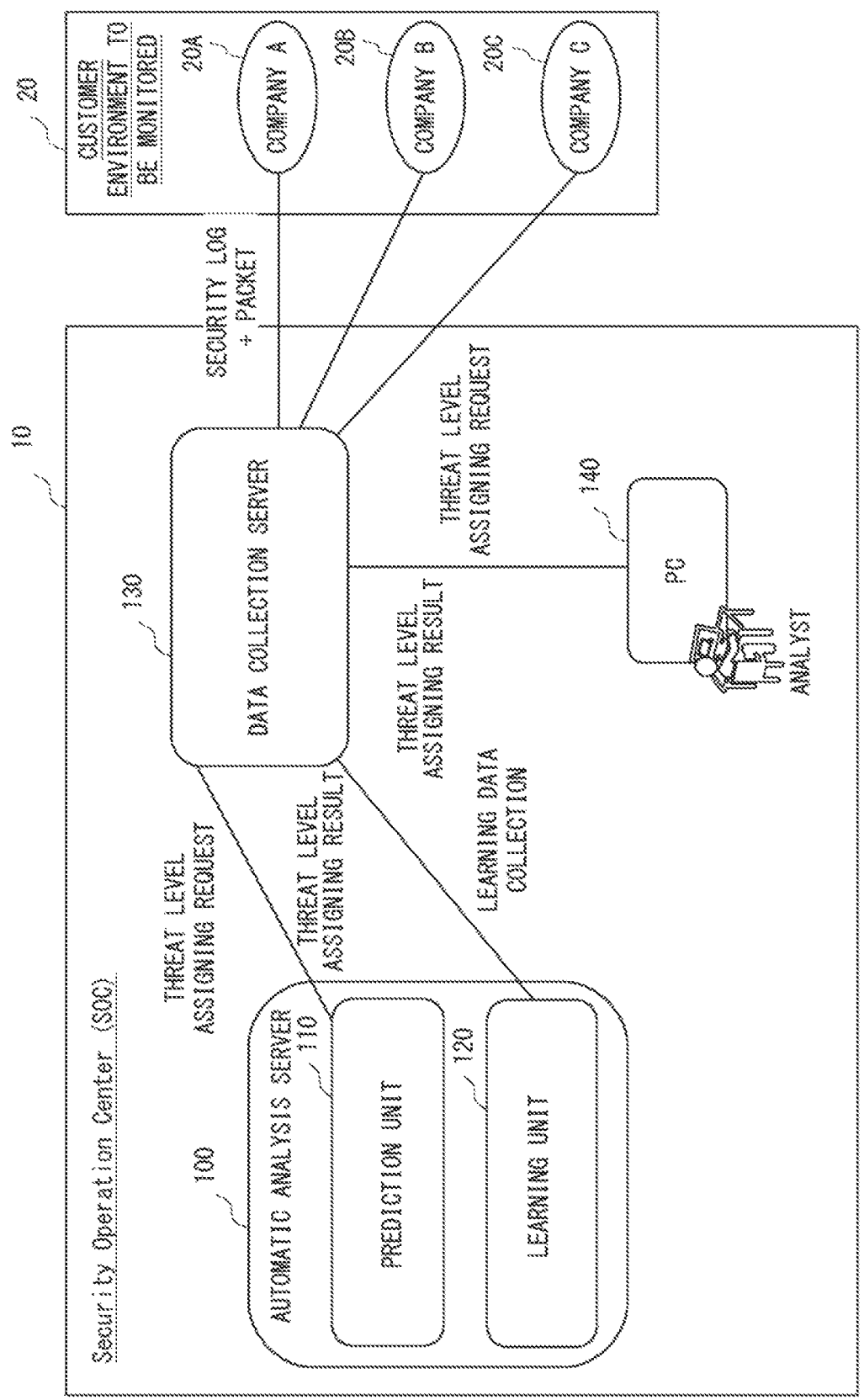
FIG. 2 is a block diagram showing an overall configuration of a threat information evaluation system according to a second example embodiment.

FIG. 2 is a block diagram showing an overall configuration of a threat information evaluation system according to a second example embodiment.

The threat information evaluation system 1 according to this example embodiment is applicable to supervised machine learning for assigning threat levels to an enormous amount of threat information (e.g., communication logs and packets associated therewith or the like). Threat levels assigned to threat information by analysts can be used as supervised labels. Machine learning is performed based on a large number of pairs of such an enormous amount of threat information and threat levels. Note that, as will be described later in detail, the threat information evaluation system 1 can automatically select feature values that are used in such supervised learning. In other words, the machine learning algorithm according to this example embodiment makes it possible to determine which information should be extracted from an enormous amount of threat information, or which information should be extracted for each company or each period.

An overall configuration of the threat information evaluation system according to this example embodiment will be described with reference to FIG. 2.

As shown in FIG. 2, the threat information evaluation system 1 includes an SOC (Security Operation Center) 10 and a customer environment to be monitored 20. The SOC 10 and the customer environment to be monitored 20 are connected to each other through a network. Here, examples of the network include a local area network (LAN) and a wide area network (WAN) such as the Internet.

The customer environment to be monitored 20 includes computers and servers of various organizations such as companies and groups of people. As shown in FIG. 2, the customer environment to be monitored 20 can include, for example, a company A, a company B, and a company C. In the customer environment to be monitored 20, when a communication apparatus such as a computer or a server detects communication that is suspicious in terms of the security, each computer in each company transmits communication logs and packets associated therewith to the SOC 10.

The SOC 10 receives, for example, communication logs and packets as threat information from communication apparatuses installed in the customer environment to be monitored 20, and assigns threat levels to the logs and packets. Specifically, the SOC 10 includes a data collection server 130, at least one PC (Personal Computer) 140 for an analyst, and an automatic analysis server 100. Note that the automatic analysis server 100 is an example of the information processing apparatus described in the above-described first example embodiment.

The data collection server 130 can receive threat information from each company, and separately manage the threat information for each company. The data collection server 130 can transmit all or a part of the collected threat information to the PC 140 for the analyst, and request the analyst to assign threat levels thereto.

The analyst manually assigns threat levels to the threat information sent to the PC 140. Specifically, the analyst can assign threat levels by checking the logs and packets. In this way, results of the assigning of threat levels, with which correct data is associated, to threat information are collected in the data collection server 130. The data collection server 130 transmits the results of the assigning of threat levels to a learning unit 120 of the automatic analysis server 100.

The learning unit 120 of the automatic analysis server 100 receives, from the data collection server 130, the results of the assigning of threat levels as learning data. Further, when the learning unit 120 has accumulated a sufficient amount of learning data, it can automatically perform learning and generate a learning model (or a trained model) that is used for the automatic analysis of the assigning of threat levels. The automatic analysis server 100 stores the learning model, which has been generated as described above, in a storage unit included in the server or in an external storage unit connected to the server through a network. Note that, as will be described later in detail, the learning unit 120 can automatically select a feature value from the learning data when a certain amount of learning data or larger has been accumulated.

A prediction unit 110 of the automatic analysis server 100 can automatically assign a label to threat information sent from each company through the data collection server 130 by using the above-described learning model stored in the storage unit.

Meanwhile, threat information and attack patterns evolve day by day, so the data collection server 130 is configured to be able to transmit new threat information to the PC 140 in order to request, as required, the analyst to assign a threat level thereto. For example, threat information at a predetermined level or higher needs to be assigned a label thereto by an analyst. Therefore, the result of the manual assigning of a threat level is transmitted to the learning unit 120 of the automatic analysis server 100 through the data collection server 130. In this way, the learning unit 120 can periodically collect new learning data, which has been assigned threat labels, and perform relearning and regenerate the learning model based on the updated learning data.

Note that although the above-described example has been described under the assumption that the automatic analysis server 100 and the data collection server 130 are separate entities, they may be an integrated server. Further, the learning unit 120 and the prediction unit 110 of the automatic analysis server 100 may be implemented by separate servers.

Figure 3:
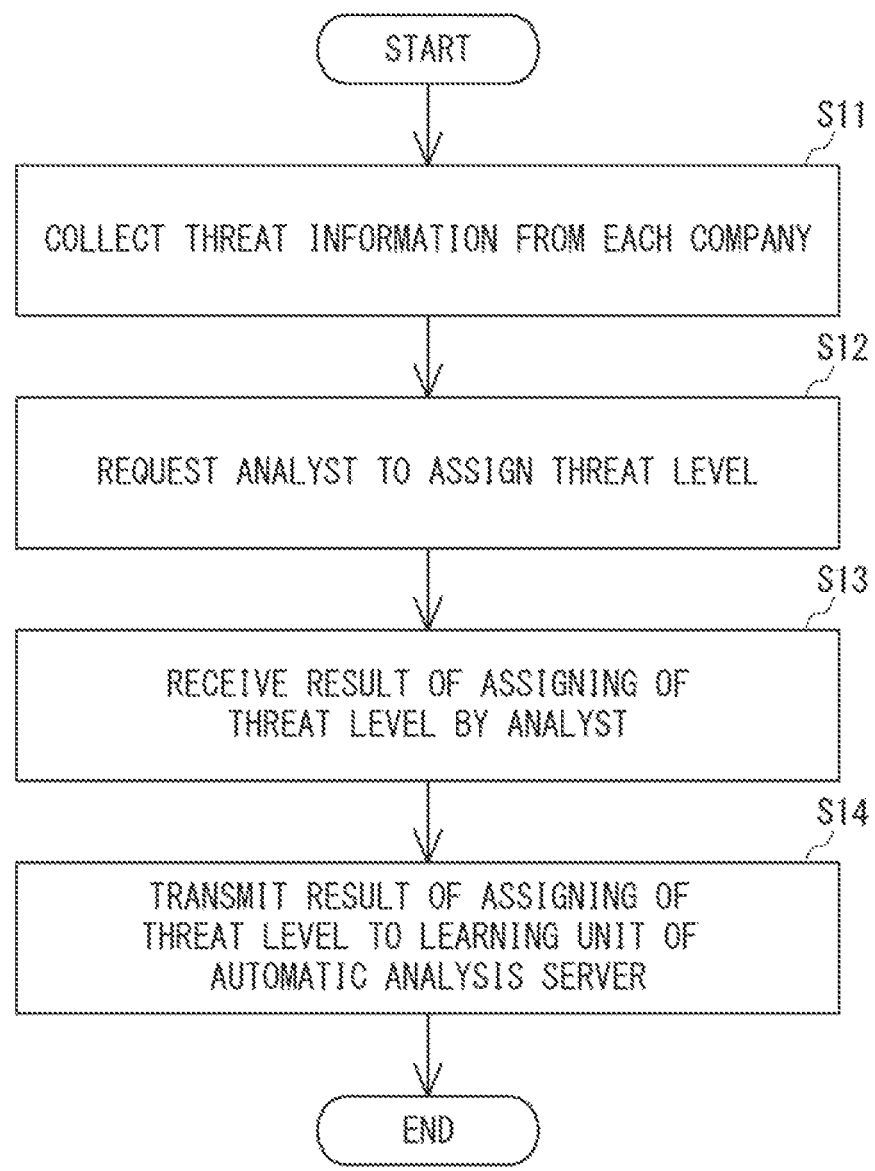
FIG. 3 is a flowchart showing a flow of processes performed by a data collection server when learning is performed.

FIG. 3 is a flowchart showing operations performed by the data collection server when learning is performed.

The data collection server 130 collects threat information (e.g., security logs and packets associated therewith) from each company (Step S11). The data collection server 130 may manage threat information for each company or for each predetermined period (e.g., one year). The data collection server 130 transmits all or a part of the collected threat information to the PC 140 for an analyst, and requests the analyst to assign threat levels thereto (Step S12). When the analyst has completed the assigning of threat levels, the data collection server 130 receives the result of the assigning of threat levels (Step S13). After that, the data collection server 130 transmits the result of the assigning of threat levels as learning data to the learning unit 120 of the automatic analysis server 100 (Step S14).

Figure 4:
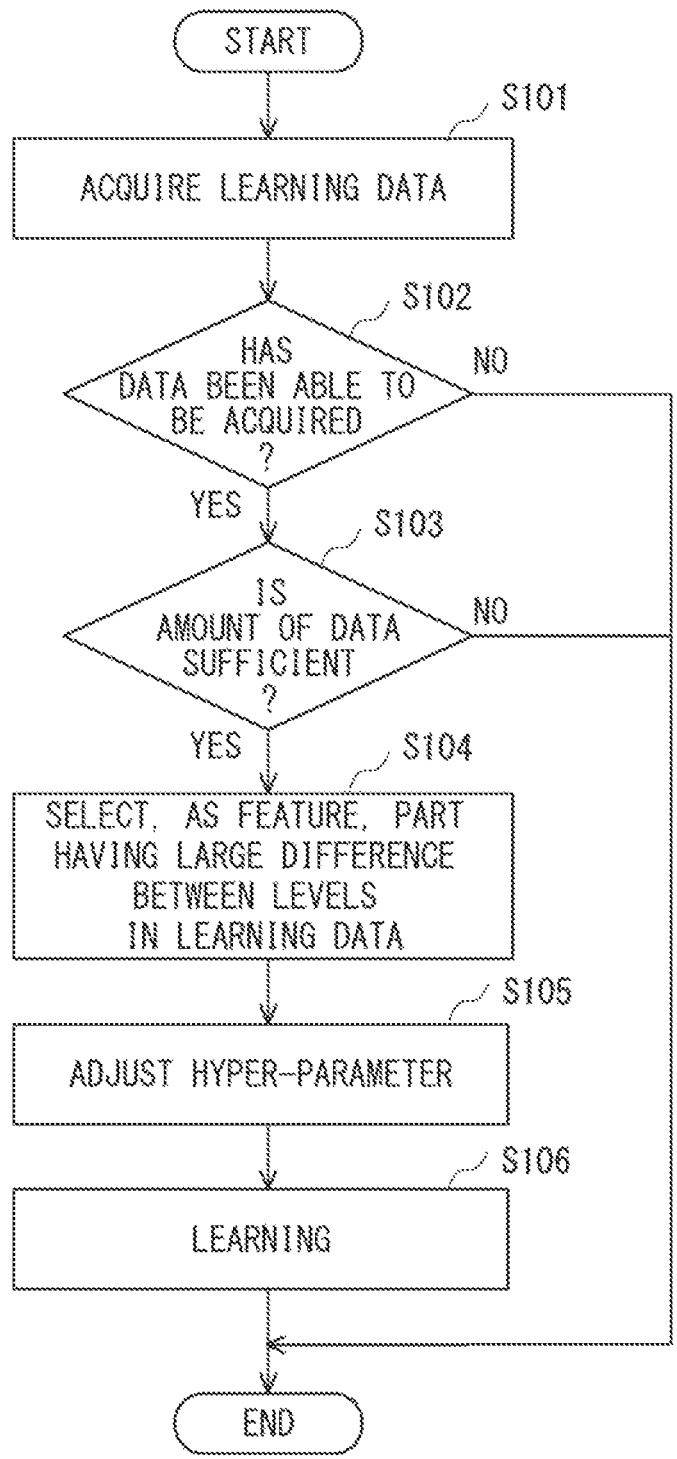
FIG. 4 is a flowchart showing a flow of learning processes performed by a learning unit.

FIG. 4 is a flowchart showing a learning process performed by the learning unit.

The learning unit 120 acquires the result of the assigning of threat levels from the data collection server 130 as learning data (Step S101). This learning data includes a plurality of items of threat information output from a security system. That is, such learning data can be represented by a learning table in which a plurality of items are represented by respective columns and one threat information is represented by a row. Each row contains an item "threat level". The threat level can include a plurality of levels. When the learning unit 120 can acquire learning data (Yes in Step S102) and the amount of data is sufficient (Yes in Step S103), the learning unit 120 selects, when a difference between feature values at different levels is larger (e.g., when a difference between feature values is larger than a threshold) in the learning data, an item (a column) of a part having this large difference as a feature (Step S104). Details of this step (i.e., an automatic feature value selection process during the learning) will be described later. Next, the learning unit 120 adjusts a hyper-parameter (Step S104). The learning unit 120 converts the selected column into a numerical value by using a feature value (e.g., frequency information). After that, the learning unit 120 performs machine learning based on the feature value, which has been selected and converted into a numerical value as described above (Step S106). A learning model (or a trained model) generated as described above is stored in a storage unit or the like of the learning unit.

Note that weighting on a feature value may be changed according to the difference between feature values detected at different levels. For example, when the difference is relatively large, the column is regarded as an important column and hence the weighting on the feature value may be increased. On the other hand, when the difference is relatively small, the column is regarded as mere reference information and hence the weighting on the feature value may be reduced.

Next, the automatic feature value selection process during the learning will be described.

Figure 5:
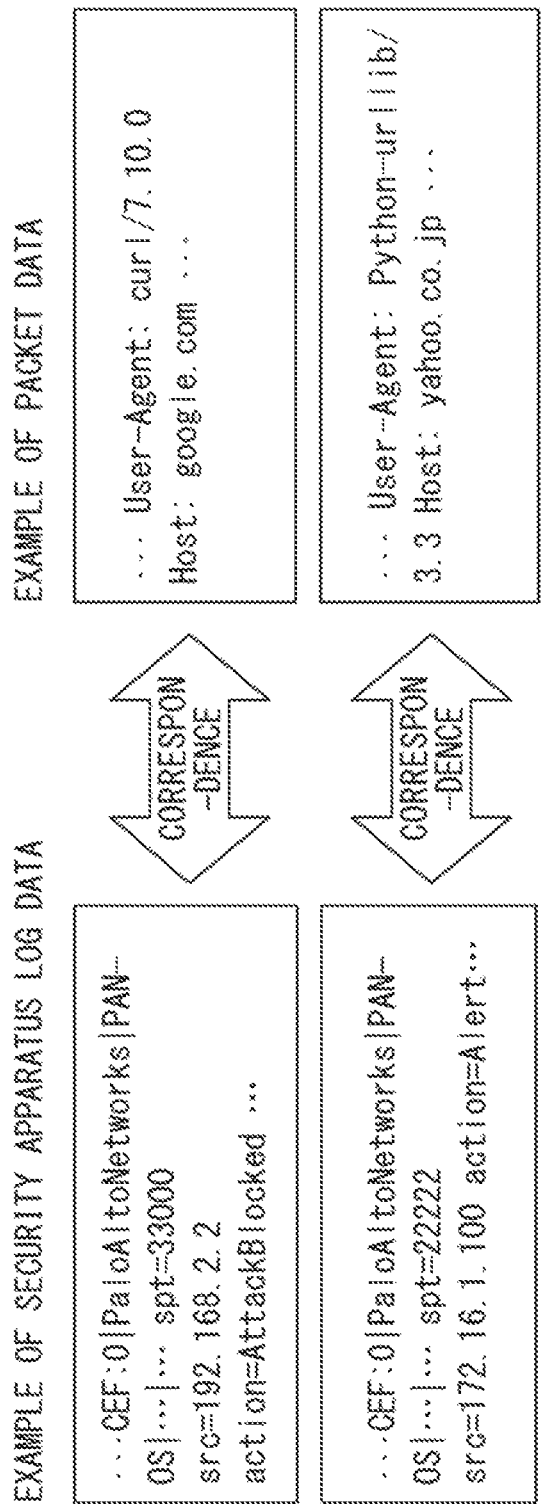
FIG. 5 shows an example of log data of a security apparatus, and an example of packet data corresponding to the log data.

FIG. 5 shows an example of log data of a communication apparatus, and an example of packet data corresponding to the log data. FIG. 6 is an example of a learning data table in which the log data and the packet data shown in FIG. 5 are merged. Note that, in this specification, each column in the learning data table shown in FIG. 6 may also be referred to as an item.

Frequency information of a character string that appears in each column of the learning data table generated as described above can be used as a feature value. For example, a feature value X can be expressed as "X=(frequency information of sourcePort, frequency information of deviceEventCategory, . . . , frequency information of User-Agent, frequency information of Host, . . . ).

For normal feature values, frequency information over the all the columns is used. However, if information unnecessary for predicting a threat level is contained in feature values, the accuracy of the prediction deteriorates. Therefore, in this embodiment, only columns (items) that can contribute to the assigning of threat levels are selected as feature values. For example, when the frequency information over all the columns is represented by $X_{before}$, the frequency information over the columns (items) that contribute to the assigning of threat levels, which are selected by performing the algorithm according to this embodiment, can be represented as $X_{after}$.

$X_{before}$=(frequency information of destinationPort, frequency information of deviceEventCategory, . . . , frequency information of User-Agent, frequency information of Host, . . .)

$X_{after}$=(frequency information of deviceEvent Category, . . . , frequency information of User-Agent, . . . )

An automatic feature value selection will be described hereinafter with reference to FIGS. 7, 8 and 9.

Figure 7:
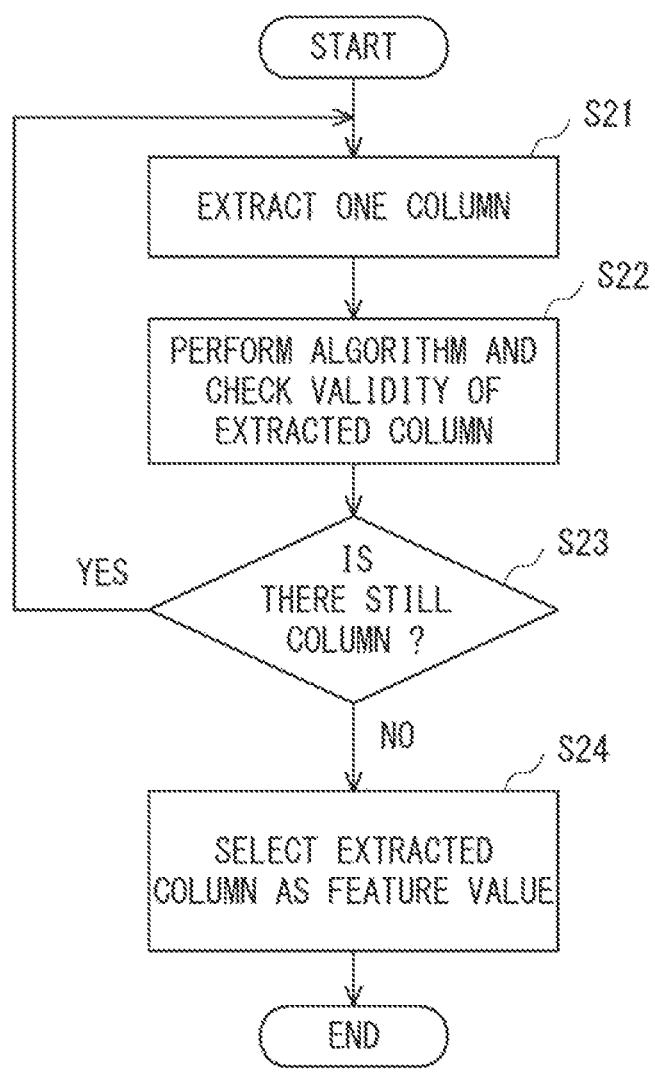
FIG. 7 is a flowchart showing a flow of processes for selecting a column that can be used as a feature from all the columns according to the second example embodiment.

FIG. 7 is a flowchart showing a flow of processes for selecting a column that can be used as a feature from all the columns according to the second example embodiment.

One column is arbitrarily extracted from among all the columns in the learning data table (Step S21). For the extracted column, the algorithm for the automatic feature value selection process (which will be described later with reference to FIG. 8) is independently performed. Then, the validity of the extracted column, i.e., whether or not the column can contribute to the assigning of threat levels, is checked (Step S22). Next, it is checked whether or not there is still a column whose validity has not been checked yet (Step S23). When there is still an unchecked column (Yes in Step S23), the processes in the steps S21 and S22 are repeated. After the validity of all the columns is checked (No in Step S23), all the extracted columns are selected as feature values (Step S24).

Figure 8:
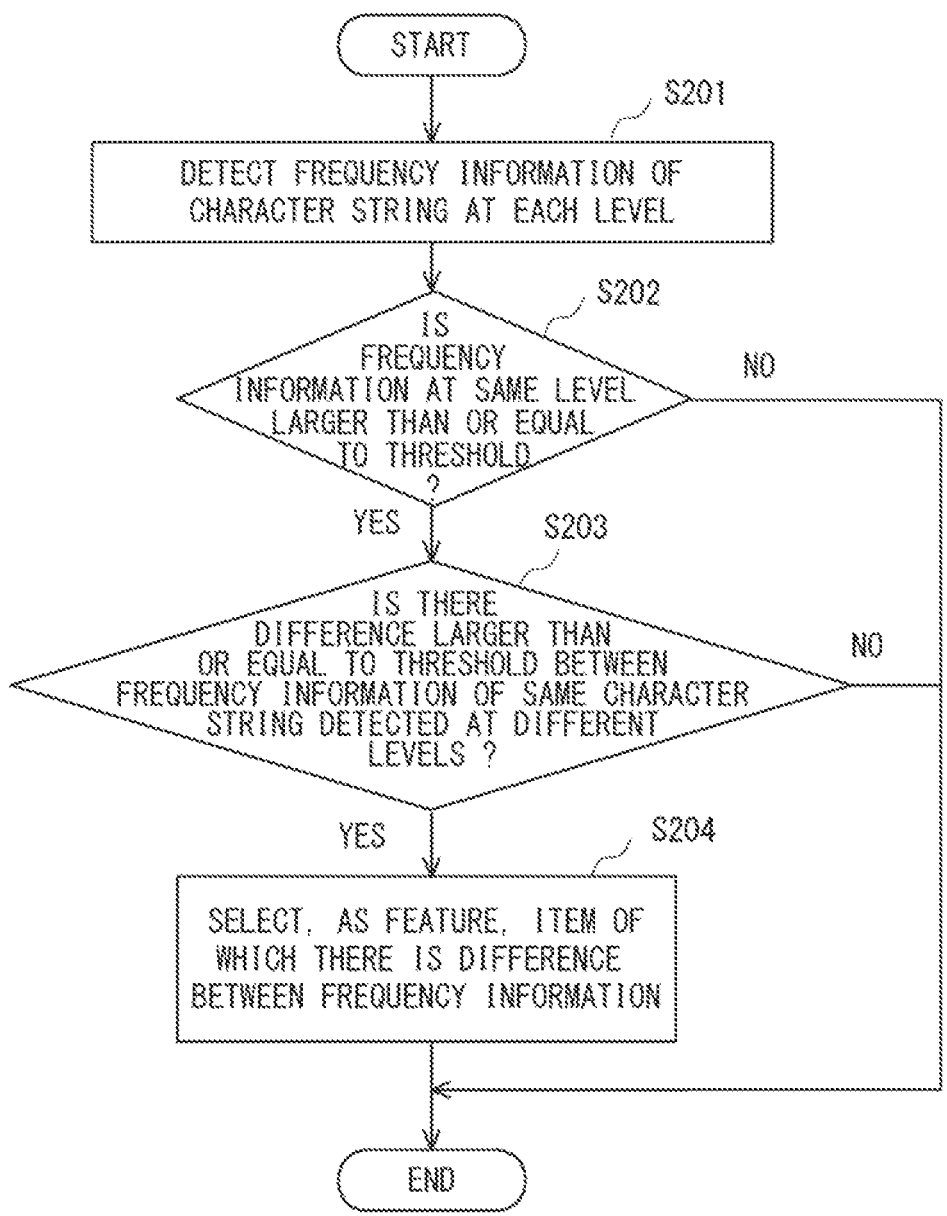
FIG. 8 is a flowchart showing a flow of an automatic feature-value selection process according to the second example embodiment.

FIG. 8 is a flowchart showing a flow of the automatic feature value selection process according to the second example embodiment.

For the extracted columns in the learning data table, frequency information of each of various character strings is detected at each level (Step S201). It is determined whether the frequency information of a character string detected at the same level is larger than or equal to a threshold (Step S202). When the frequency information of the character string detected at the same level is smaller than the threshold (No in Step S202), it is interpreted that the character string does not have any regularity. The column interpreted as described above is not used as a feature, and the process is finished.

On the other hand, when the frequency information of the character string detected at the same level is larger than the threshold (Yes in Step S202), it is interpreted that the character string has regularity. Next, it is determined whether there is a difference larger than or equal to a threshold between frequency information (i.e., two or more pieces of frequency information) of the same character string detected at different levels (Step S203). When there is no difference larger than or equal to the threshold between the frequency information of the character string detected at different levels (No in Step S203), it is interpreted that this character string cannot be used as a feature that can contribute to the assigning of threat levels. The column interpreted as described above is not used as a feature, and the process is finished.

On the other hand, when there is a difference larger than or equal to the threshold between the frequency information of the character string detected at different levels (Yes in Step S203), the column (the item) having this difference is selected as a feature (Step S204).

When there is at least one character string of which there is a difference between frequency information at different levels in the same column, the column containing this character string may be selected as a feature. Alternatively, when there are at least a predetermined number of character strings of each of which there is a difference between frequency information at different levels in the same column, the column containing the predetermined number of character strings may be selected as a feature. The larger the number of character strings contained in the column is, larger weighting may be assigned to the column.

FIG. 9 is a diagram for explaining an automatic selection of a feature value in detail.

In the table shown in FIG. 9, learning data is assigned threat levels in such a manner that the first row correspond to a level 1 and the second row corresponds to a level 2. These threat levels have been assigned in advance by an analyst. In this example, it is assumed that packet data based on which columns are generated is http. Further, in the table according to this embodiment, there are four columns, i.e., sourcePort, http_response_content_type, http_user_agent, and http_host. Further, FIG. 9 shows frequency information of each of various character strings detected from each column in the learning data. A process for performing the algorithm according to this embodiment for each column and thereby selecting a column that can be used as a feature will be described hereinafter.

In the column "sourcePort", a character string "55202" is detected at one place (i.e., for which one hit is obtained) and a character string "29766" is detected at one place at the level 1. Further, a character string "16027" is detected at one place and a character string "39777" is detected at one place at the level 2. That is, in the class at the level 1, each of the character strings "55202" and "29766" is detected at one place, which is smaller than the threshold (e.g., five places), so there is no imbalance nor regularity in the frequency information. Similarly, in the class at the level 2, each of the character strings "16027" and "39777" is detected at one place and, which is smaller than the threshold (e.g., five places), so there is no imbalance nor regularity in the frequency information. Therefore, it is interpreted that the column "sourcePort" cannot be used as a feature that can contribute to the assigning of threat levels. Therefore, it is possible to eliminate the data in the column "sourcePort" from the learning data.

In the column "http_response_content_type", a character string "text/html" is detected at 100 places and a character string "text/plain" is detected at 10 places at the level 1. Further, the character string "text/html" is detected at 100 places and the character string "text/plain" is detected at 10 places at the level 2.

That is, since the numbers of detected places of "text/html" and "text/plain" are both larger the threshold (e.g., larger than or equal to five places), they have regularity in one class at the level 1 or 2. However, the number of detected places of "text/html" is 100 at both the levels 1 and 2, so there is no difference between frequency information of this character string detected at different levels (i.e., frequency information of this character string at the level 1 and that of this character string at the level 2). Similarly, the number of detected places of "text/plain" is 10 at both the levels 1 and 2, so there is no difference between frequency information of this character string detected at different levels. Therefore, it is interpreted that the column "http_response_content_type" cannot be used as a feature that can contribute to the assigning of threat levels. Therefore, it is possible to eliminate the data in the column "http_response_content_type" from the learning data.

In the column "http_user_agent", a character string "Mozilla" is detected at 100 places and a character string "python-requests" is detected at 10 places at the level 1. Further, the character string "python-requests" is detected at 90 places and the character string "Mozilla" is detected at 20 places in the level 2. That is, since the numbers of detected places of "Mozilla" and "python-requests" are both larger the threshold (e.g., larger than or equal to five places), they have regularity in one class at the levels 1 and 2. Further, while the number of detected places of "Mozilla" is 100 at the level 1, the number of detected places of "Mozilla" is 20 at the level 2. Therefore, there is a difference larger than or equal to the threshold (e.g., 10 places) between frequency information at the levels 1 and 2. Similarly, while the number of detected places of "python-requests" is 10 at the level 1, the number of detected places of "python-requests" is 90 at the level 2. Therefore, there is a difference larger than or equal to the threshold (e.g., 10 places) between frequency information at the levels 1 and 2. Therefore, it is interpreted that the column "http_user_agent" can be used as a feature that can contribute to the assigning of threat levels. Note that although the column "http_user_agent" in which two character strings "Mozilla" and "python-requests" are extracted is selected as a feature in this example, a column in which only one character string is extracted may be selected as a feature. Alternatively, a column in which a predetermined number of character strings or larger are extracted may be selected as a feature.

In the column "http_host", at the level 1, a character string "www.normal1.com" is detected at 90 places; a character string "www. malicious1.com" is detected at 10 places; and a character string "www.malicious2.com" is detected at 10 places. Further, at the level 2, the character string "www.malicious1.com" is detected at 50 places; the character string "www.malicious2.com" is detected at 50 places; and the character string "www.normal1.com" is detected at 10 places. That is, since the numbers of detected places of "www.normal1.com", "www.malicious1.com", and "www.malicious2.com" are all larger the threshold (e.g., larger than or equal to five places), they have regularity in one class at the level 1 or 2. Further, while the number of detected places of "www.normal1.com" is 90 at the level 1, the number of detected places of "www.normal1.com" is 10 at the level 2. Therefore, there is a difference larger than or equal to the threshold (e.g., 10 places) between frequency information at the levels 1 and 2. Further, while the number of detected places of "www.malicious1.com" is 10 at the level 1, the number of detected places of "www.malicious1.com" is 50 at the level 2. Therefore, there is a difference larger than or equal to the threshold (e.g., 10 places) between frequency information at the levels 1 and 2. Further, while the number of detected places of "www.malicious2.com" is 10 at the level 1, the number of detected places of "www.malicious2.com" is 50 at the level 2. Therefore, there is a difference larger than or equal to the threshold (e.g., 10 places) between frequency information at the levels 1 and 2. Therefore, it is interpreted that the column "http_host" can be used as a feature that can contribute to the assigning of threat levels. Note that although the column "http_host" in which three character strings "www.normal1.com", "www.malicious1.com", and "www.malicious2.com" are extracted is selected as a feature, a column in which only one character string is extracted may be selected as a feature. Alternatively, a column in which a predetermined number of character strings or larger are extracted may be selected as a feature.

As described above, the learning unit according to this embodiment can automatically select the column "http_user_agent" and the column "http_host" as feature values for the learning. In other words, it is possible to eliminate unnecessary data such as the column "sourcePort" and the column "http_response_content_type" from the learning data and thereby to reduce the calculation cost of the subsequent machine learning and the like.

Although the case of two threat levels has been described in the above-described example embodiment, the concept of the present invention is also applicable to the case of three threat levels or more. For example, when there are three threat levels, each of differences among these three levels, i.e., differences between the levels 1 and 2, between the levels 1 and 3, and between the levels 2 and 3, may be calculated. By calculating the differences among all the levels as described above, more appropriate learning data can be selected.

Further, although the frequency information of all the character strings are compared with one another with equal weighting added thereto in the above-described example, weighting on certain character strings may be increased or decreased.

As described above, two character strings are detected as features in the column "http_user_agent", and three character strings are detected as features in the column "http_host". Weighting on a column may be changed according to the number of detected character strings.

Further, although frequency information of a character string is used as a feature value, a difference between frequency information of a given character string and that of another character string may be used as a feature value.

The learning unit 120 can learn an attack trend for a specific company (e.g., the company A) or in a specific industry by performing machine learning by using, as learning data, the result of assigning of threat levels to threat information obtained only from the specific company or only from the specific industry. That is, the data collection server 130 may divide learning data for each company or each industry, and provide the divided data to the learning unit 120.

Alternatively, the learning unit 120 can learn an overall attack trend irrespective of the company or the industry by performing machine learning by using, as learning data, the result of assigning of threat levels to threat information obtained from various organizations such as companies (e.g., the companies A, B, C, etc.) and groups of people.

Further, the learning unit 120 can learn an attack trend for a certain period of time (e.g., the past one year) by performing machine learning by using, as learning data, the result of assigning of threat levels to threat information for the certain period of time.

Third Example Embodiment

Figure 10:
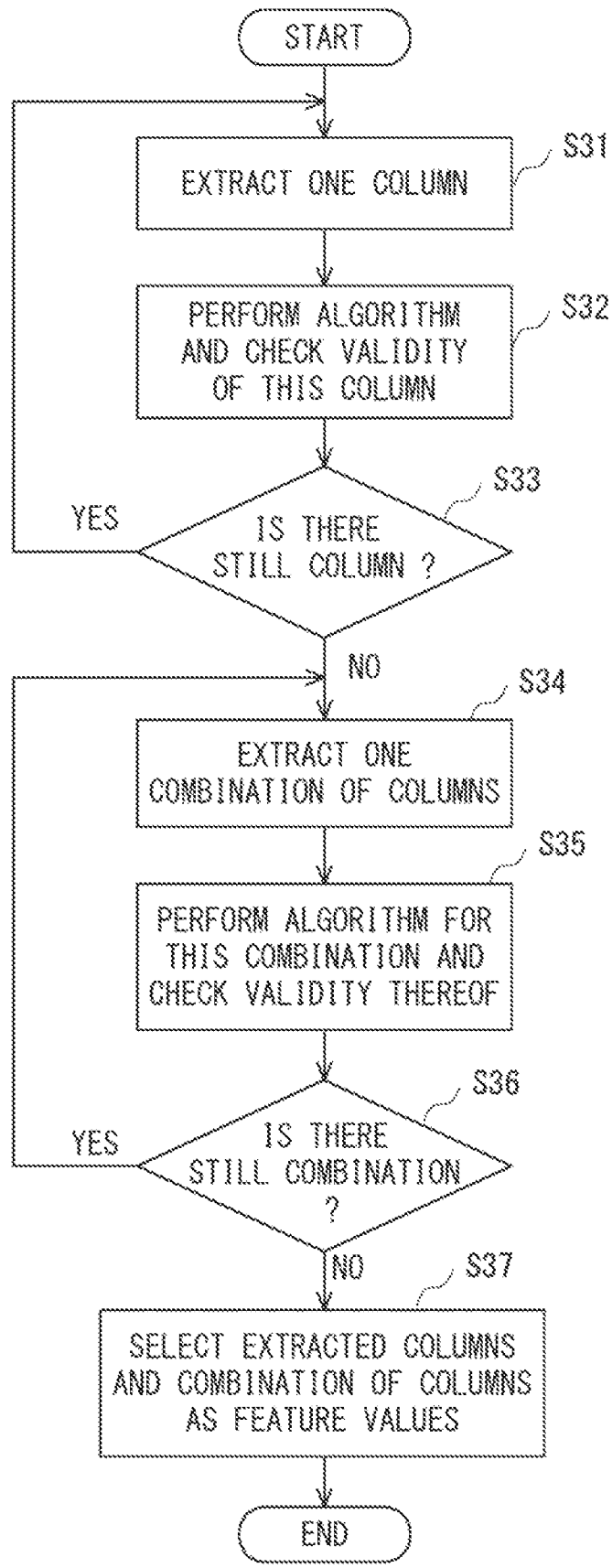
FIG. 10 is a flowchart showing a flow of an automatic feature-value selection process according to a third example embodiment.

FIG. 10 is a flowchart showing a flow of an automatic feature value selection process according to a third example embodiment.

In this example embodiment, a combination of columns can be incorporated (i.e., used) as a choice of selection from which a feature value is automatically selected.

One column is extracted from among all the columns in a learning data table (Step S31). That is, for each column, the algorithm for the automatic feature value selection process (see FIG. 8) is independently performed. Then, the validity of the extracted column, i.e., whether or not the column can contribute to the assigning of threat levels, is checked (Step S32). Next, it is checked whether or not there is still a column whose validity has not been checked yet (Step S33). When there is still an unchecked column (Yes in Step S33), the processes in the steps S31 and S32 are repeated. After the validity of all the columns is checked (No in Step S33), one combination of columns at the same level is extracted (Step S34). For example, a combination of destinationPort and transportProtocol may be extracted because it is impossible to determine whether it is udp or tcp based on destinationPort alone. Such a combination may be extracted based on a combination rule that is determined in advance based on analyst's advice. That is, a combination of columns having a high correlation therebetween may be extracted. In such a case, such a combination of columns may be added as a new column (e.g., destinationPort_transportProtocol) in the learning data table in advance.

The algorithm is performed for the combination of columns extracted at the same level, so that the validity thereof is checked (Step S35). That is, as described above with reference to FIG. 8, for the extracted combination, the frequency information of the combination of character strings is detected. For example, in the example shown in FIG. 9, when a column "sourcePort" and a column "http_response_content_type" at the level 1 are combined with each other, the combination of character strings, which should be detected, may be "55202_text/html" and "55202_text/plain".

Further, when there is a difference larger than or equal to a threshold between the frequency information of the character strings detected at different levels, a combination of columns containing the combination of character strings having the difference is selected as a feature. When there is still a combination obtained based on the predetermined combination rule (Yes in Step S36), the processes in the steps S34 and S35 are repeated. When there is no longer any combination obtained based on the predetermined combination rule (No in Step S33), the extracted columns and the combination of the columns are selected as feature values (Step S37).

According to this embodiment, by incorporating a combination of columns, a feature that can contribute to the assigning of threat levels can be extracted more appropriately. As a result, it is possible to reduce the calculation cost of the subsequent learning process.

Note that, in the above-described example embodiment, it is assumed that the learning unit 120 extracts a certain combination of columns (e.g., a combination of columns having a high correlation therebetween). However, the learning unit 120 may acquire a learning data table in which a combination of columns that is determined in advance by an analyst is added.

Fourth Example Embodiment

Figure 11:
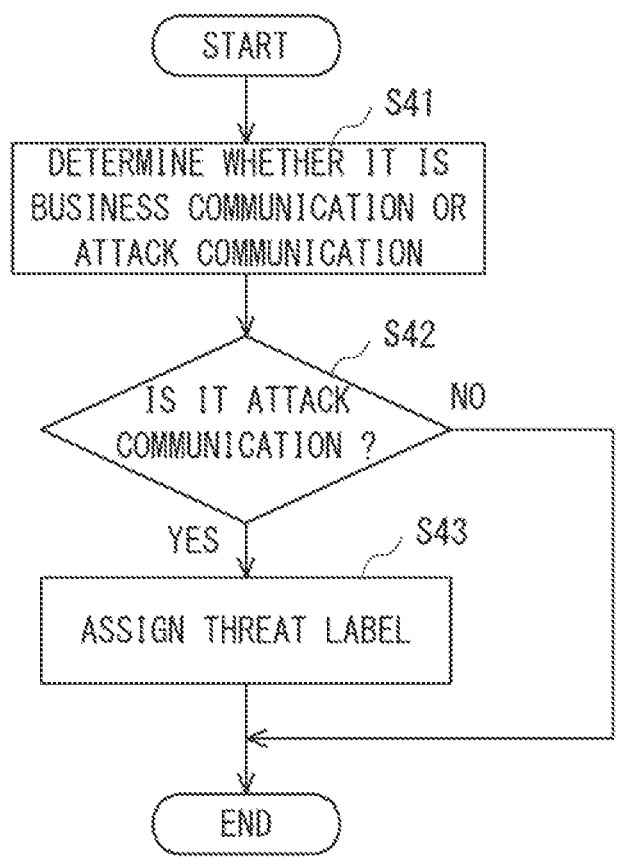
FIG. 11 is a flowchart showing a flow of a prediction process according to a fourth embodiment.

FIG. 11 is a flowchart showing a flow of a prediction process according to a fourth embodiment.

A prediction unit 110 of an automatic analysis server 100 receives, as threat information, security logs and packets associated therewith from each company through a data collection server 130. Firstly, the prediction unit 110 determines whether or not the received threat information is business communication or attack communication (Step S41). The determination as to whether the threat information is business communication or attack communication can be made by using an existing technology. When it is determined that the threat information is attack communication (Yes in Step S42), the prediction unit 110 assigns a threat level thereto by using a learning model generated through learning as described above (Step S43). On the other hand, when it is determined that the threat information is not attack communication (No in Step S42), the prediction unit 110 does not assign any threat level thereto and the process is finished.

Note that although the prediction unit 110 may automatically perform the prediction process based on the learning model, in some cases, threat information at a high security level cannot be predicted from existing learning data. Therefore, it is preferable that: such threat information at a predetermined level or higher be assigned a threat level by an analyst; the result of the assigning of a threat level be sent back to the learning unit; and the learning unit update the learning model.

In each of the flowcharts shown in FIGS. 3, 4, 7, 8, 10 and 11, a specific execution order is shown. However, the execution order may be changed from the order shown in the flowchart. For example, the execution order of two or more steps may be interchanged from the order shown in the flowchart. Further, two or more consecutive steps shown in the flowchart may be executed simultaneously or partially simultaneously to each other. Further, in some of the example embodiments, one or a plurality of steps shown in the flowchart may be skipped or omitted.

Figure 12:
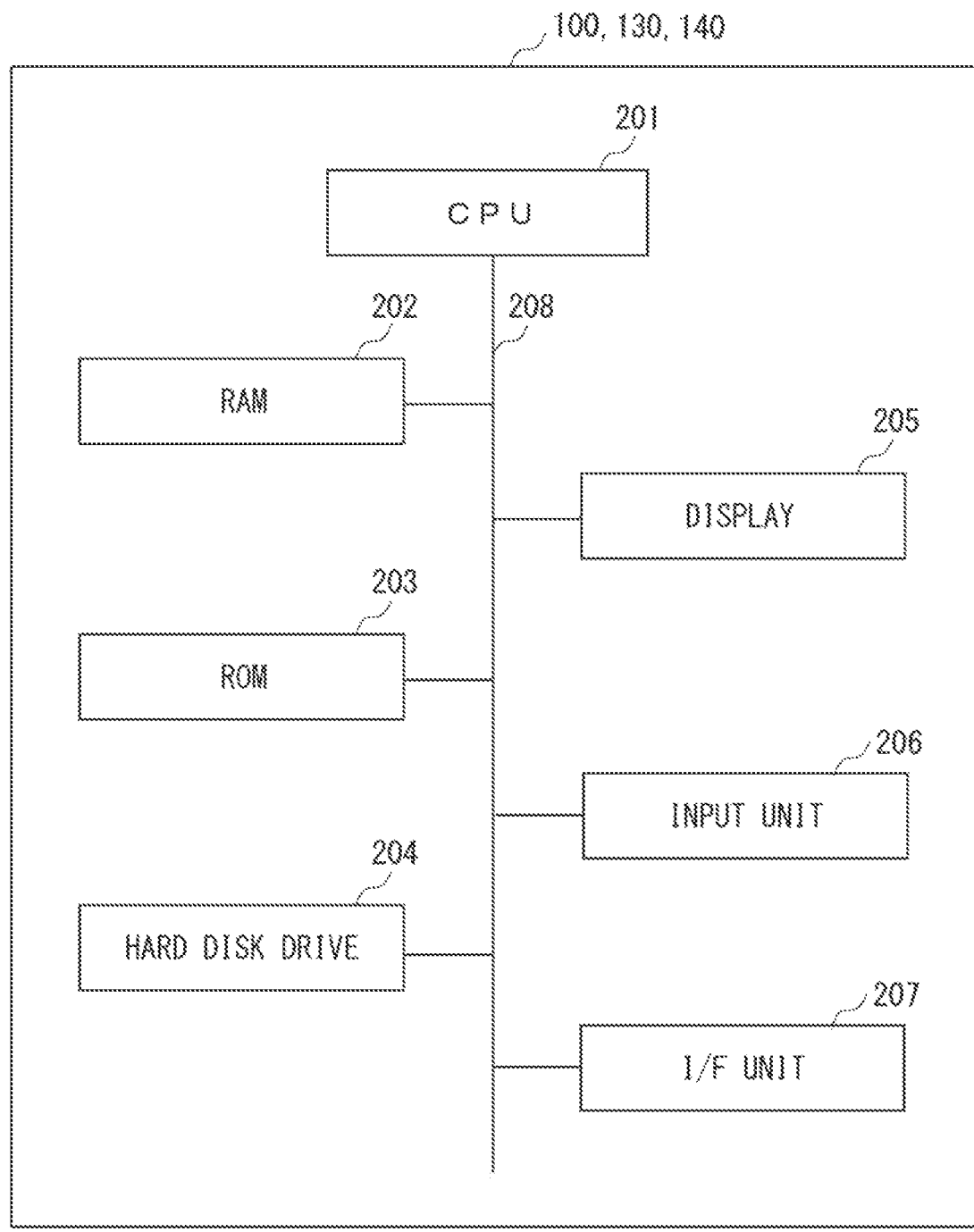
FIG. 12 is a block diagram showing an example of a hardware configuration of each of a server 100, a server 130, and a PC 140.

FIG. 12 is a block diagram showing an example of a hardware configuration of each of the server 100, the server 130, and the PC 140. As shown in FIG. 12, each of the server 100, the server 130, and the PC 140 in the example embodiment is a computer including a CPU (Central Processing Unit) 201, RAM (Random access memory) 202, ROM (Read Only Memory) 203, and the like. The CPU 201 performs calculations and controls according to software stored in the RAM 202, the ROM 203, or a hard disk drive 204. The RAM 202 is used as a temporary storage area when the CPU 201 performs various processes. In the hard disk drive 204, an operating system (OS), a registration program, and the like are stored. A display 205 includes a liquid-crystal display and a graphics controller. Images, objects such as icons, and GUIs are displayed on the display 205. An input unit 206 is a device through which a user provides various instructions to a terminal apparatus 200, and includes, for example, a mouse, a keyboard, a touch panel, and/or the like. An I/F (InterFace) unit 207 can control wireless LAN communication and/or wired LAN communication in conformity with a standard such as IEEE 802.11a, and through which communication with an external apparatus is performed through the same communication network and the Internet based on a protocol such as TCP/IP. A system bus 208 controls exchange of data between any two of the CPU 201, the RAM 202, the ROM 203, the hard disk drive 204, and the like.

In the above-described examples, the program can be stored and provided to a computer using any type of non-transitory computer readable media. Non-transitory computer readable media include any type of tangible storage media. Examples of non-transitory computer readable media include magnetic storage media, optical magnetic storage media, CD-ROM (Read Only Memory), CD-R, CD-R/W, and semiconductor memories. Examples of the magnetic storage media include flexible disks, magnetic tapes, and hard disk drives. Examples of the semiconductor memories include mask ROM, PROM (programmable ROM), EPROM (Erasable PROM), flash ROM, and RAM (random access memory). Further, the program may be supplied to a computer by using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present invention is not limited to the above-described example embodiments, and they can be modified as appropriate without departing from the scope and spirit of the invention. A plurality of examples described above may be combined as appropriate with one another and implemented in a combined manner.

The whole or part of the example embodiments disclosed above can be described as, but not limited to, the following supplementary notes.

(Supplementary note 1)

An information processing apparatus comprising:
an acquisition unit configured to acquire learning data containing a plurality of items, the learning data being assigned a first level and a second level whose threat level is higher than the first level;
a first feature value detection unit configured to detect a first feature value of a specific character string from learning data belonging to the first level;
a second feature value detection unit configured to detect a second feature value of the specific character string from learning data belonging to the second level;
a difference detection unit configured to detect a difference between the first and second feature values; and
a selection unit configured to select, when the difference is larger than or equal to a threshold, learning data of an item to which the specific character string belongs.

(Supplementary note 2)

The information processing apparatus described in Supplementary note 1, wherein the feature value is frequency information.

(Supplementary note 3)

The information processing apparatus described in Supplementary note 1 or 2, wherein the first and second feature values are larger than or equal to a threshold.

(Supplementary note 4)

The information processing apparatus described in any one of Supplementary notes 1 to 3, wherein when the learning data is assigned three levels or more, the difference detection unit extracts a difference between each of all possible pairs of levels.

(Supplementary note 5)

The information processing apparatus described in any one of Supplementary notes 1 to 4, wherein the acquisition unit acquires learning data classified for each organization.

(Supplementary note 6)

The information processing apparatus described in any one of Supplementary notes 1 to 5, wherein the acquisition unit periodically acquires learning data assigned a threat level by an analyst.

(Supplementary note 7)

The information processing apparatus described in any one of
Supplementary notes 1 to 6, wherein
the first feature value detection unit detects a first feature value of a specific character string from learning data belonging to a specific item, the first feature value belonging to the first level, and
the first feature value detection unit detects another first feature value of a specific character string from learning data belonging to a specific item, the other first feature value belonging to the second level (Supplementary note 8)

The information processing apparatus described in any one of Supplementary notes 1 to 7, wherein the acquisition unit acquires the learning data containing a combination of predetermined items among a plurality of items.

(Supplementary note 9)

The information processing apparatus described in any one of Supplementary notes 1 to 8, wherein the learning data contains communication log data and a packet associated with the communication log data.

(Supplementary note 10)

The information processing apparatus described in any one of Supplementary notes 1 to 9, further comprising a learning unit configured to perform machine learning by using learning data of the selected item.

(Supplementary note 11)

The information processing apparatus described in Supplementary note 10, further comprising a prediction unit configured to assign a threat level to threat information based on a learning model generated by the learning unit.

(Supplementary note 12)

The information processing apparatus described in Supplementary note 11, further comprising a determination unit configured to determine whether the threat information is business communication or attack communication, wherein
the prediction unit assigns a threat level to threat information determined to be the attack communication by the determination unit.

(Supplementary note 13)

A threat information evaluation system comprising:
a data collection server configured to collect threat information from an outside thereof;
a computer by which an analyst assigns a threat level to the collected threat information; and
an information processing apparatus described in any one of Supplementary notes 1 to 12.

(Supplementary note 14)

An information processing method comprising:
acquiring learning data containing a plurality of items, the learning data being assigned a first level and a second level whose threat level is higher than the first level;
detecting a first feature value of a specific character string from learning data belonging to the first level;
detecting a second feature value of the specific character string from learning data belonging to the second level;
detecting a difference between the first and second feature values; and
selecting, when the difference is larger than or equal to a threshold, learning data of an item to which the specific character string belongs.

(Supplementary note 15)

A program for causing a computer to perform:
a process of acquiring learning data containing a plurality of items, the learning data being assigned a first level and a second level whose threat level is higher than the first level;
a process of detecting a first feature value of a specific character string from learning data belonging to the first level;
a process of detecting a second feature value of the specific character string from learning data belonging to the second level;
a process of detecting a difference between the first and second feature values; and
a process of selecting, when the difference is larger than or equal to a threshold, learning data of an item to which the specific character string belongs.

(Supplementary note 16)

An information processing method comprising:
collecting threat information from an outside;
transmitting at least a part of the collected threat information to a computer, the computer being one by which an analyst assigns a threat level to the at least a part of the collected threat information;
acquiring learning data as a result of the assigning of the threat level in the computer, the learning data containing a plurality of items and being assigned a first level and a second level whose threat level is higher than the first level;
detecting a first feature value of a specific character string from learning data belonging to the first level;
detecting a second feature value of the specific character string from learning data belonging to the second level;
detecting a difference between the first and second feature values; and
selecting, when the difference is larger than or equal to a threshold, learning data of an item to which the specific character string belongs.

(Supplementary note 17)

A program for causing a computer to perform:
a process of collecting threat information from an outside;
a process of transmitting at least a part of the collected threat information, the computer being one by which an analyst assigns a threat level to the at least a part of the collected threat information;
a process of acquiring learning data as a result of the assigning of the threat level in the computer, the learning data containing a plurality of items and being assigned a first level and a second level whose threat level is higher than the first level;
a process of detecting a first feature value of a specific character string from learning data belonging to the first level;
a process of detecting a second feature value of the specific character string from learning data belonging to the second level;
a process of detecting a difference between the first and second feature values; and
a process of selecting, when the difference is larger than or equal to a threshold, learning data of an item to which the specific character string belongs.

REFERENCE SIGNS LIST

1 THREAT INFORMATION EVALUATION SYSTEM
10 SOC
20 CUSTOMER ENVIRONMENT TO BE MONITORED
100 AUTOMATIC ANALYSIS SERVER
101 ACQUISITION UNIT
102 FIRST FEATURE-VALUE DETECTION UNIT
103 SECOND FEATURE-VALUE DETECTION UNIT
104 DIFFERENCE DETECTION UNIT
105 SELECTION UNIT
110 PREDICTION UNIT
120 LEARNING UNIT
130 DATA COLLECTION SERVER
140 PC

What is claimed is:
1. An information processing apparatus comprising:
a memory storing instructions; and
at least one processor configured to execute the instructions to:
acquire learning data containing a plurality of items, the learning data being assigned a first level and a second level higher than the first level;
to detect a first feature value of a specific character string from the learning data belonging to the first level;
detect a second feature value of the specific character string from the learning data belonging to the second level;
detect a difference between the first and second feature values; and
select, when the difference is larger than or equal to a threshold, the learning data of an item to which the specific character string belongs.

2. The information processing apparatus according to claim 1, wherein the first and second feature values are each frequency information.

3. The information processing apparatus according to claim 1, wherein the first and second feature values are larger than or equal to a threshold.

4. The information processing apparatus according to claim 1, wherein when the learning data is assigned three levels or more, the at least one processor extracts a difference between each of all possible pairs of the levels.

5. The information processing apparatus according to claim 1, wherein the at least one processor acquires the learning data classified for each of a plurality of organizations.

6. The information processing apparatus according to claim 1, wherein the at least one processor periodically acquires the learning data assigned a threat level by an analyst.

7. The information processing apparatus according to claim 1, wherein
the at least one processor detects the first feature value of the specific character string from the learning data belonging to a specific item, the first feature value belonging to the first level, and
the at least one processor detects another first feature value of the specific character string from the learning data belonging to the specific item, the other first feature value belonging to the second level.

8. The information processing apparatus according to claim 1, wherein the at least one processor acquires the learning data containing a combination of predetermined items among the plurality of items.

9. The information processing apparatus according to claim 1, wherein the learning data contains communication log data and a packet associated with the communication log data.

10. The information processing apparatus according to claim 1, wherein the at least one processor is configured to execute the instructions to further perform machine learning by using the learning data of the selected item.

11. The information processing apparatus according to claim 10, wherein the at least one processor is configured to execute the instructions to further assign a threat level to threat information based on a learning model generated by performing the machine learning.

12. The information processing apparatus according to claim 11, wherein the at least one processor is configured to execute the instructions to further determine whether the threat information is business communication or attack communication, and
the processor assigns a threat level to the threat information determined to be the attack communication.

13. An information processing method performed by a computer and comprising:
acquiring learning data containing a plurality of items, the learning data being assigned a first level and a second level higher than the first level;
detecting a first feature value of a specific character string from learning data belonging to the first level;
detecting a second feature value of the specific character string from learning data belonging to the second level;
detecting a difference between the first and second feature values; and selecting, when the difference is larger than or equal to a threshold, learning data of an item to which the specific character string belongs.

14. A non-transitory computer readable medium storing a program for causing a computer to perform:
- a process of acquiring learning data containing a plurality of items, the learning data being assigned a first level and a second level higher than the first level;
- a process of detecting a first feature value of a specific character string from learning data belonging to the first level:
- a process of detecting a second feature value of the specific character string from learning data belonging to the second level;
- a process of detecting a difference between the first and second feature values; and
- a process of selecting, when the difference is larger than or equal to a threshold, learning data of an item to which the specific character string belongs.

\* \* \* \* \*